April 12, 1966    J. W. FRIED    3,245,288

CUTTER AND CUTTER HOLDER FOR INTERNAL GROOVING

Filed June 29, 1964

JOSEPH W. FRIED
INVENTOR.

BY Hazard & Miller
ATTORNEYS

United States Patent Office

3,245,288
Patented Apr. 12, 1966

3,245,288
CUTTER AND CUTTER HOLDER FOR INTERNAL GROOVING
Joseph W. Fried, 4619 Nagle Ave., Sherman Oaks, Calif.
Filed June 29, 1964, Ser. No. 378,922
4 Claims. (Cl. 77—58)

This invention relates to a cutter and cutter holder primarily designed for use in internal grooving or recessing. The cutter and cutter holder have been primarily designed to be employed in conjunction with an automatically actuated recessing head of the type employing the general principles disclosed in my co-pending application entitled Recessing Tool, Serial No. 321,523 filed November 5, 1963. However, it may also be used in other applications such as for boring purposes in a conventional machine lathe.

Heretofore, various types of boring bars have been designed for use on machine lathe and similar machine tools wherein the cutter extends transversely through an opening adjacent the end of the bar and is retained in position therein by one or more set screws. When such a design is employed, the cutter and the opening must necessarily be relatively small, as an increase in the size of the opening through the cutter holder or bar weakens the bar at this location. To avoid this weakening, some boring bars have been designed with V-shaped grooves extending transversely or diametrically across the end of the bar, and V-shaped or triangular cutters are positioned therein. While such a design may reduce the weakening of the bar or cutter holder when compared with bars having openings therethrough, the V-shape or triangular shape of the cutter is detrimental in grinding the cutting edge or grinding the extreme end of the cutter to the desired shape. Where the cutter is of triangular cross section, a special fixture is usually required to hold the cutter in the desired position while its cutting edge is being ground either for sharpening or shaping purposes.

Other objections are also present where cutters of triangular cross section are employed.

In ordinary boring operations, such as are produced in boring a hole on a machine lathe, the cutter need extend laterally from the cutter holder or boring bar only a short distance and, therefore, the beam strength of the cutter need not be great. On the other hand, where the cutter holder or boring bar is used in an automatic recessing tool of the type employing the general principles of the recessing tool employed in my co-pending application, the throw of the tool is ordinarily not very great. Consequently, the axis of a cutter holder or boring bar is usually fairly close to the axis of the hole in which the internal groove is to be cut. Consequently, the length of the cutter may be required to be considerable in extending laterally from the boring bar to the wall surface of the hole that is to be internally grooved. The beam strength or cross sectional size of the cutter must, therefore, be as great as is reasonably possible to resist the reactionary forces imposed thereon in the course of the internal grooving.

One object of the present invention is to provide an improved cutter and cutter holder for internal grooving or recessing which is so designed that the holder will not be objectionably weakened by the design employed for mounting the cutter thereon and, at the same time, the cutter may be of adequate cross sectional size so as to possess the necessary cantilever beam strength to properly effect cuting on the workpiece.

Another object of the present invention is to provide a cutter and cutter holder having the above mentioned characteristics wherein the cutter has a smooth flat bottom surface of considerable area which can be used as a base or plane of orientation in the course of grinding or shaping the cutting edge on the cutter. In this manner, the employment of a special fixture for holding the cutter in the course of grinding the cutting edge or shaping the cutting edge can be eliminated.

Another object of the present invention is to provide a cutter and cutter holder which are of such mutually related shapes and designs that the cutter, when applied to the cutter holder, will be firmly retained thereon and held against sliding or displacement. By means of the firm engagement between the cutter and the holder, chattering can be greatly reduced, if not completely eliminated.

With the foregoing and other objects in view, which will be manifest in the following detailed description and specifically pointed out in the appended claims, reference is had to the accompanying drawings for an illustrative embodiment of the invention, wherein:

Figure 1:
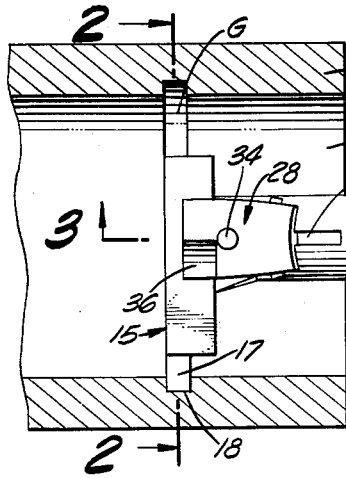
FIGURE 1 is a top plan view of the improved cutter and holder therefor, illustrating it in applied position within a workpiece that is being internally grooved or recessed.

Referring to the accompanying drawing wherein similar reference characters designate similar parts throughout, the cutter holder consists of a generally cylindrical bar 10 that is generally cylindrical throughout the major portion of its length although it is preferably enlarged at its bottom and sides, as indicated at 11, adjacent its forward end. The forward end is so formed or shaped as to provide an outer end face 12 and an inner end face 13 that is spaced inwardly from the outer face and which is preferably parallel thereto. These end faces are connected by an inclined surface 14 which cooperates with the upper inner end face 13 to define a V-shaped groove extending entirely across the end of the bar 10. The usual cutter that is employed consists of a bar of high speed steel 15 that is generally rectangular in cross section presenting a flat bottom surface 16 of considerable area which can be used as a base or plane of orientation when grinding the cutting tip 17 on the end thereof or sharpening or dressing the cutting edge 18. The cutter 15 preferably also provides a flat top surface 19 and two parallel side surfaces 20 and 21 that are complementary to the end faces 12 and 13, respectively. It also provides an inclined surface 22 that is complementary to the inclined surface 14. The top of the forward end of the bar 10 is beveled off, as indicated at 23, and is longitudinally milled, as at 24, to provide a key way. It is also transversely milled, as at 25, to receive a fulcrum pin 26 that may be fastened in place, such as in brazing, welding or the equivalent, as indicated at 27. A cap 28 is provided which has a key 29 formed on its under surface that is notched, as at 30, to accommodate that portion of the fulcrum pin 26 that extends across the key way 24. The key 29 on the underside of the cap 28 otherwise snugly fits the key way 24 and serves to hold the cap 28 against lateral displacement. The underside of the bar 10 is recessed, as indicated at 31, to accommodate the head 32 of a tightening screw that extends through an inclined bore 33 in the bar 10 and which threadedly engages the threaded hole in the cap, as indicated at 34. The head 32 is socketed so as to receive a socket wrench, not shown, by which the tightening screw can be tightened or loosened. When the screw is tightened, it causes the cap 28 to move downwardly through an arc, the center of which is the center of the fulcrum pin 26 and causes the flat under surface of the cap at 35 to firmly engage the top surface 19 of the cutter 15.

As the movement of the surface 35 downwardly about the center of the fulcrum pin 26 as a center is through an arc, the tightening of the cap causes the engaging surfaces 14 and 22 to crowd cutter 15 rearwardly and causes the opposed surfaces 12, 20, 13, and 21 to engage quite firmly. The direction of movement is also such as to cause a small component of the force exerted by the cap to cause these opposed surfaces to firmly engage. Consequently, as the cap 28 is held against lateral displacement relative to the bar 10 by the key and groove engagement at 24 and 29 and the mutual engaging surfaces 12, 20, 13, 21, 19, and 35 are rather extensive. The frictional engagement between the cutter and the cutter holder is such that the cutter cannot be easily displaced in a direction longitudinally of the cutter holder. The cutter may also be regarded as being loaded compressively by the cap, and this together with the above mentioned engaging surfaces contributes to the avoidance of chattering.

A chip throat 36 is preferably formed on the cap to handle cuttings that are cut from the workpiece. Other forms of fulcrums may be employed to fulcrum the cap 28 on the bar 10 at or near the location of the fulcrum pin 26 in lieu of the particular fulcruming means disclosed. The bar 10 may have a key way 37 formed on its side to fit an automatic recessing tool, as disclosed in my co-pending application, or in lieu thereof one or more flats may be formed on the sides of the bar 10 for the same purpose.

In use, the bar 10 may be introduced into a hole H in a workpiece W and, when introduced, it will have normally its longitudinal axis parallel to and fairly close to the axis of the hole. In the course of cutting, the bar 10 is moved laterally toward the wall of the hole so as to carry the cutting edge 18 against the wall of the hole in cutting the groove or recess G.

It will be appreciated from an inspection of FIGURE 1 that, when the tool is used in this manner, the cutting edge 18 is spaced considerably from the axis of the bar 10. Consequently, the projecting portion of the cutter 15 functions as a cantilever beam.

With the design and arrangement above disclosed, it will be appreciated that the cross section of the cutter 15 is adequate to carry all stresses that would normally be imposed thereon in the course of cutting the groove. Although the bar 10 is weakened near its end by the hole 33 required to accommodate the tightening screw, this is minor if it is compared with the size of the hole in the bar that would be required for a cutter of the same cross sectional size extending transversely through the bar. The shape of the cutter is such that although it is formed of high speed steel, it can be easily rolled or milled to the required shape to fit simultaneously against the surfaces 12, 13, and 14. The cutter can also be produced from a cast alloy, carbide, etc. When the cutting tip becomes dulled or must be reground either for purposes of shaping or sharpening, the cap 28 can be loosened by the tightening screw and the cutter slid longitudinally from the end of the bar 10. The flat bottom surface 16 on the bottom of the cutter can then be advantageously employed as a base plane that is established on the cutter with respect to which the cutting tip may be formed.

Figure 3:
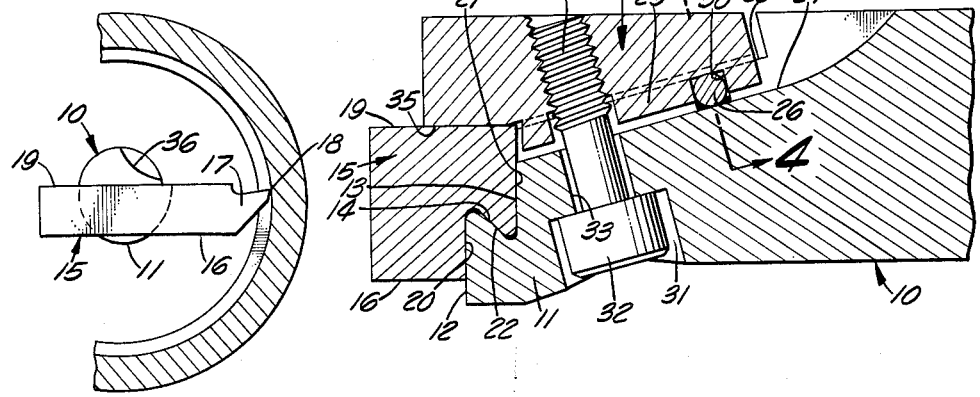
FIGURE 3 is a partial view in vertical section taken substantially upon line 3—3 upon FIGURE 1.
Figure 2:
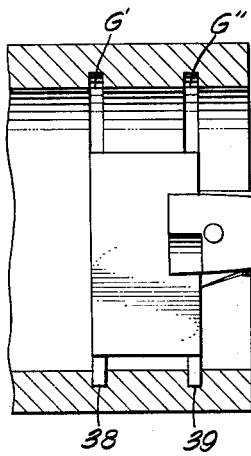
FIGURE 2 is an end view taken substantially upon the line 2—2 upon FIGURE 1 in the direction indicated.
Figure 4:
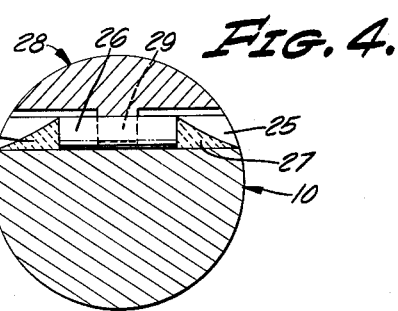
FIGURE 4 is a sectional view taken substantially upon line 4—4 upon FIGURE 3.
Figure 5:
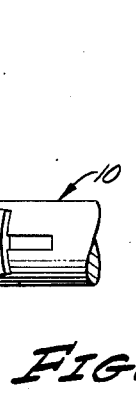
FIGURE 5 is a view similar to FIGURE 1, but illustrating an alternative form of cutter that may be employed.

The invention is not restricted to employing cutters of rectangular cross sectional outline that is approximately square, as shown in FIGURE 3. On the contrary, if a plurality of grooves or recesses are to be formed in the workpiece, as indicated by the grooves G' and G", as illustrated in FIGURE 5, the cutter may be of considerable width and have two cutting tips 38 and 39 ground or formed thereon enabling both grooves to be cut simultaneously.

While the present invention has been primarily designed for use with a recessing tool, as disclosed in my co-pending application, it may be used advantageously for other and analogous purposes including the use as a boring bar on a machine lathe.

Various changes may be made in the details of construction without departing from the spirit and scope of the invention, as defined by the appended claims.

I claim:

1. A recessing tool comprising a bar across the end of which there is an outer end face and an inner end face spaced inwardly from the outer end face and an inclined surface connecting the top of the outer end face to the bottom of the inner end face, a cutter presenting surfaces complementary to and in engagement with the outer and inner end faces and said inclined surface, a cap fulcrumed on the bar inwardly from the inner end face and bearing on top of the cutter, means disposed between the point of fulcrum and the cutter for drawing the cap downwardly about the fulcrum toward the cutter to tighten the cutter against both end faces and said inclined surface, there being an interfitting connection between the cap and the bar for holding the cap against lateral displacement relative to the bar.

2. A recessing tool comprising a bar having an upwardly open V-shaped groove extending across the end thereof, a cutter extending across the end of said bar having a portion disposed in the groove and other portions bearing against the bar above and below the groove, a cap fulcrumed on the bar, a tightening screw extending through the bar and cap for tightening the cap downwardly about its fulcrum against the top of the cutter, said cap having a key and groove connection with the bar from the inner end thereof to the cutter holding the cap against lateral displacement relative to the bar.

3. A recessing tool comprising a bar having an upwardly open V-shaped groove extending across the end thereof, a cutter extending across the end of said bar having a portion disposed in the groove and other portions bearing against the bar above and below the groove, a cap fulcrumed on the bar, a tightening screw extending through the bar and cap for tightening the cap downwardly about its fulcrum against the top of the cutter, said cap having a key and groove connection with the bar at opposite sides of the tightening screw for holding the cap against lateral displacement relative to the bar, said bar having means by which it may be oriented about its longitudinal axis.

4. A recessing tool comprising a bar across the end of which there is an outer end face and an inner end face spaced inwardly from the outer end face and an inclined surface connecting the top of the outer end face to the bottom of the inner end face, a cutter presenting surfaces complementary to the outer and inner end faces and said inclined surface, a cap fulcrumed on the bar inwardly from the inner end face and bearing on top of the cutter, means disposed between the point of fulcrum and the cutter for drawing the cap downwardly about the fulcrum toward the cutter to tighten the cutter against both end faces and said inclined surface.

References Cited by the Examiner

UNITED STATES PATENTS

| 1,496,984 | 6/1924 | Felsch | 29—96 |
| 2,768,831 | 10/1956 | Bellmann | 29—96 |
| 2,865,084 | 12/1958 | Wendt et al. | 29—96 |
| 3,052,952 | 9/1962 | Bader et al. | 29—96 |

FOREIGN PATENTS 568,876   4/1945   Great Britain.

WILLIAM W. DYER, Jr., *Primary Examiner.*

G. A. DOST, *Assistant Examiner.*